(12) United States Patent
Wittliff, III et al.

(10) Patent No.: US 9,963,011 B2
(45) Date of Patent: May 8, 2018

(54) PARKED VEHICLE INTERIOR LIFEFORM RECOGNITION

(71) Applicants: Bosch Automotive Service Solutions Inc., Warren, MI (US); Robert Bosch GmbH, Stuttgart (DE)

(72) Inventors: William W. Wittliff, III, Gobles, MI (US); Jeremy L. Hargis, Farmington, MI (US)

(73) Assignees: Bosch Automotive Service Solutions Inc., Warren, MI (US); Robert Bosch GmbH, Stuttgart (DE)

( * ) Notice: Subject to any disclaimer, the term of this patent is extended or adjusted under 35 U.S.C. 154(b) by 0 days. days.

(21) Appl. No.: 15/390,071

(22) Filed: Dec. 23, 2016

(65) Prior Publication Data

US 2017/0190233 A1  Jul. 6, 2017

Related U.S. Application Data

(60) Provisional application No. 62/273,607, filed on Dec. 31, 2015.

(51) Int. Cl.
*B60H 1/00* (2006.01)
*H04W 4/12* (2009.01)
(Continued)

(52) U.S. Cl.
CPC ..... *B60H 1/00742* (2013.01); *B60H 1/00778* (2013.01); *B60N 2/002* (2013.01);
(Continued)

(58) Field of Classification Search
CPC ............ B60H 1/00742; B60H 1/00778; B60N 2/002; G08B 21/22; G08B 21/24; H04W 4/12
See application file for complete search history.

(56) References Cited

U.S. PATENT DOCUMENTS 7,120,527 B2  10/2006  Prieto et al.
8,996,237 B2   3/2015  Bertosa et al.
(Continued)

FOREIGN PATENT DOCUMENTS

CN   201819680 U  *  5/2011
CN   101434221 B  *  5/2012
(Continued)

OTHER PUBLICATIONS

Jung, Heejung "Modeling CO2 Concentrations in Vehicle Cabin", SAE International, Paper No. 2013-01-1497, Published Apr. 8, 2013.

*Primary Examiner* — Tuan C To
(74) *Attorney, Agent, or Firm* — Maginot Moore & Beck LLP

(57) ABSTRACT

A dongle that may be plugged into an On-Board Diagnostic (OBD) port of a vehicle and provide notification if a human or animal is left within a parked car. The dongle accesses a first sensor from the vehicle's communication system and a second sensor from within the dongle. If data from the first and second sensors exceeds predetermined threshold values programmed into the dongle's memory, then the dongle sends out a response signal. The response signal may be sent to an owner's cellular phone or to a 911 dispatch center. Additional sensors within the vehicle, or placed within the dongle, may also be used to verify the presence of a human or animal left within the parked vehicle.

20 Claims, 3 Drawing Sheets

(51) Int. Cl.
  *B60N 2/00*  (2006.01)
  *G08B 21/22* (2006.01)
  *G08B 21/24* (2006.01)

(52) U.S. Cl.
  CPC ............ *G08B 21/22* (2013.01); *G08B 21/24* (2013.01); *H04W 4/12* (2013.01)

(56) References Cited

U.S. PATENT DOCUMENTS

| | | | | |
|---|---|---|---|---|
| 9,840,166 B2* | 12/2017 | Taylor | .................... | B60N 2/002 |
| 2014/0067231 A1* | 3/2014 | Mosher | .................. | F02D 28/00 |
| | | | | 701/102 |
| 2014/0297097 A1* | 10/2014 | Hurwitz | ................. | G07C 5/008 |
| | | | | 701/31.4 |
| 2015/0102900 A1* | 4/2015 | Ramchandani | ........ | G08C 17/02 |
| | | | | 340/5.25 |
| 2015/0187146 A1* | 7/2015 | Chen | ...................... | G07C 5/008 |
| | | | | 701/31.5 |
| 2015/0274180 A1* | 10/2015 | Prakah-Asante | ..... | B60W 40/09 |
| | | | | 701/36 |
| 2016/0086390 A1* | 3/2016 | Berkobin | ............... | G07C 5/008 |
| | | | | 701/1 |
| 2016/0104328 A1* | 4/2016 | Chen | .................... | G07O 5/0858 |
| | | | | 701/31.5 |
| 2016/0171802 A1* | 6/2016 | Fountain | .............. | G07C 5/0866 |
| | | | | 701/31.4 |
| 2016/0177846 A1* | 6/2016 | Wittliff | ................. | F02D 41/266 |
| | | | | 701/36 |
| 2016/0297324 A1* | 10/2016 | Taylor | .................... | B60N 2/002 |

FOREIGN PATENT DOCUMENTS

| | | | |
|---|---|---|---|
| KR | 20090049492 A | * | 5/2009 |
| KR | 20120056107 A | * | 6/2012 |

* cited by examiner

PARKED VEHICLE INTERIOR LIFEFORM RECOGNITION

TECHNICAL FIELD

This disclosure relates to systems that identify a lifeform inside a vehicle interior, and more specifically a human or animal inside a parked vehicle.

BACKGROUND

On-board diagnostics (OBD) is an automotive industry term referring to a vehicle's self-diagnostic and reporting capability. OBD systems give the vehicle owner or repair technician access to the status of the various vehicle subsystems. The amount of diagnostic information available via OBD has varied widely since its introduction in the early 1980s versions of on-board vehicle computers. More recent OBD implementations use a standardized digital communications port to provide real-time data in addition to a standardized series of diagnostic trouble codes (DTCs), which allow one to rapidly identify and remedy malfunctions within the vehicle.

OBD-II is a current standard that specifies the type of diagnostic connector and its pinout, the electrical signaling protocols available, and the messaging format. It also provides a candidate list of vehicle parameters to monitor along with how to encode the data for each. There is also a pin in the connector that provides power from the vehicle battery for scan tools which are connected to the OBD-II port, which eliminates the need to connect a scan tool to a power source separately.

Modern vehicles are equipped with multiple systems and various sensors used in those systems. The modern automobile may have as many as 70 electronic control units (ECU) for various systems and subsystems. Typically the biggest processor is the engine control unit. Others are used for transmission, airbags, antilock braking/ABS, cruise control, electric power steering, audio systems, power windows, doors, mirror adjustment, battery and recharging systems for hybrid/electric cars, to name a few. Some of these systems are completely independent, but communications among others may exist.

A controller area network (CAN bus) is a vehicle bus standard designed to allow microcontrollers and devices from these various systems and subsystems to communicate with each other without a host computer. It is a message-based protocol, designed originally for multiplex electrical wiring within automobiles, but is also used in many other contexts. Development of the CAN bus started roughly in 1983 at Robert Bosch GmbH. The protocol was officially released in 1986 at the Society of Automotive Engineers (SAE) congress in Detroit, Mich.

An OBD port provides an access port to the OBD system which in turn is connected to the CAN bus and thus communication with the varying systems, subsystems, and sensors (and access to some sensor data) within a vehicle is possible.

Humans and animals may be left inside a vehicle when the vehicle is parked. This has been an issue with parked vehicles practically since the inception of the first vehicles, but even more so as vehicles started to have enclosed cabins. In 1910, Cadillac became the first company in North America to offer a passenger car with a fully enclosed cabin. Vehicles are not currently, nor have ever been, equipped with systems to identify if a human or animal is left inside a parked vehicle. Even if solutions have been developed or proposed to identify humans and animals which may be left inside a parked vehicle, there is also no known solution for the already existing vehicles on the road today. The following disclosure solves this long felt need.

SUMMARY

One aspect of this disclosure is directed to a dongle for identifying if a human or animal is inside a parked car. The dongle is configured to couple with an On-Board Diagnostic (OBD) system of a parked vehicle to send a response signal if at least two matching conditions are met. The vehicle in this aspect has a first sensor in communication with the OBD system providing first sensor data to the OBD system. The dongle has a housing with a connector disposed along an edge of the housing which is configured to couple with an OBD port of the OBD system.

The dongle has a Central Processing Unit (CPU) disposed within the housing which is electrically connected to the connector. The OBD port provides power for the dongle. The CPU is programmed to couple with and access data from the OBD system when the dongle is plugged into the OBD port. The dongle also has a second sensor. The second sensor is at least partially disposed within the housing, is in communication with the CPU, and provides second sensor data to the CPU. The CPU is programmed to, upon receiving first sensor data exceeding a first sensor data threshold value and second sensor data exceeding a second sensor data threshold value, and the vehicle being in a parked state, send a response signal.

In one embodiment, the second sensor may be a carbon dioxide sensor. The second sensor data then would be carbon dioxide levels within an interior of the vehicle. The second sensor data threshold could then be set at 2500 parts per million of carbon dioxide or above.

The first sensor may be a temperature sensor. The temperature sensor may be either an interior cabin temperature sensor or an exterior temperature (ambient) sensor. The first sensor data may be a temperature level within an interior of the vehicle. The first sensor data threshold could be set at 90 degrees Fahrenheit or above.

The first sensor may also be an accelerometer, or a set of accelerometers or the like. In this embodiment, the first sensor data threshold value could be set at any level of transverse movement of the parked vehicle.

Alternatively, the first sensor may be a seat weight sensor. The first sensor data threshold value could then be set at any fluctuations in weight on a seat inside the parked vehicle.

The first sensor may be an interior cabin motion sensor. In this example, the first sensor data threshold could be set at any noted motion within the cabin.

The first sensor may also be a photo sensor having a view of an interior vehicle cabin. In this scenario, the first sensor data threshold could be any identification of a human or animal within the parked vehicle.

The dongle may also have a third sensor at least partially disposed within its housing. The third sensor may also be in communication with the CPU providing third sensor data to the CPU. In this embodiment, the CPU is programmed to withhold the response signal until the third sensor data exceeds a third sensor data threshold value providing, if available, yet another indication of a human or animal inside a parked car. The third sensor may be a noise sensor, and in such a case, the third sensor data threshold could be set at a fluctuating frequency and sound pressure level that is above 85 hertz and 80 decibels, respectively.

Alternatively, the vehicle may have a third sensor in communication with the OBD system providing third sensor data to the OBD system. In this alternative, the CPU may be programmed to withhold the response signal until receiving third sensor data which exceeds a third sensor data threshold value providing, if available, yet another indication of a human or animal inside a parked car.

The dongle may also have a transmitter disposed within the housing and electrically connected to the CPU. In the case where the dongle has a transmitter, the CPU may send the response signal to the transmitter to send a notification to a mobile electronic device. The mobile electronic device may be a cellular phone, although other mobile electronic devices are envisioned, and the response signal may result in a text notification being sent to a pre-programmed cellular number. Alternatively, the CPU may use a transmitter to send the response signal as an emergency call to a 911 dispatch center.

The dongle CPU may simply send the response signal into the OBD system to activate an air-conditioning system in the parked vehicle. Or the CPU may send the response signal into the OBD system to crack open a window of the parked vehicle. It is also envisioned that any combination of the above may also be possible.

Another aspect of this disclosure is directed to a lifeform recognition system for an interior of a parked automobile. In this aspect, the automobile has an on-board vehicle computer and at least one vehicle-based sensor providing first sensor data to the on-board vehicle computer. This system also has a dongle disposable within the interior of the parked automobile.

The dongle has a central processing unit (CPU) configured to communicate with the on-board vehicle computer of the parked automobile and access the vehicle-based sensor data. The dongle itself has at least one dongle-based sensor configured to provide second sensor data to the CPU. The CPU of the dongle is programmed to, upon receiving vehicle-based and dongle-based sensor data above a first and second sensor data threshold, respectively, send a response signal to a mobile electronic device located outside of the interior of the parked vehicle.

In this aspect, the at least one vehicle-based and dongle-based sensors are selected from a group consisting of a carbon dioxide sensor, a temperature sensor, an accelerometer, a weight sensor, a motion sensor, a photo sensor, and a noise sensor. As well, the system may have the vehicle-based and dongle-based sensor data received by the CPU to trigger a response signal be from two different kinds of sensors. The response signal may be a text message sent to an owner of the parked automobile.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
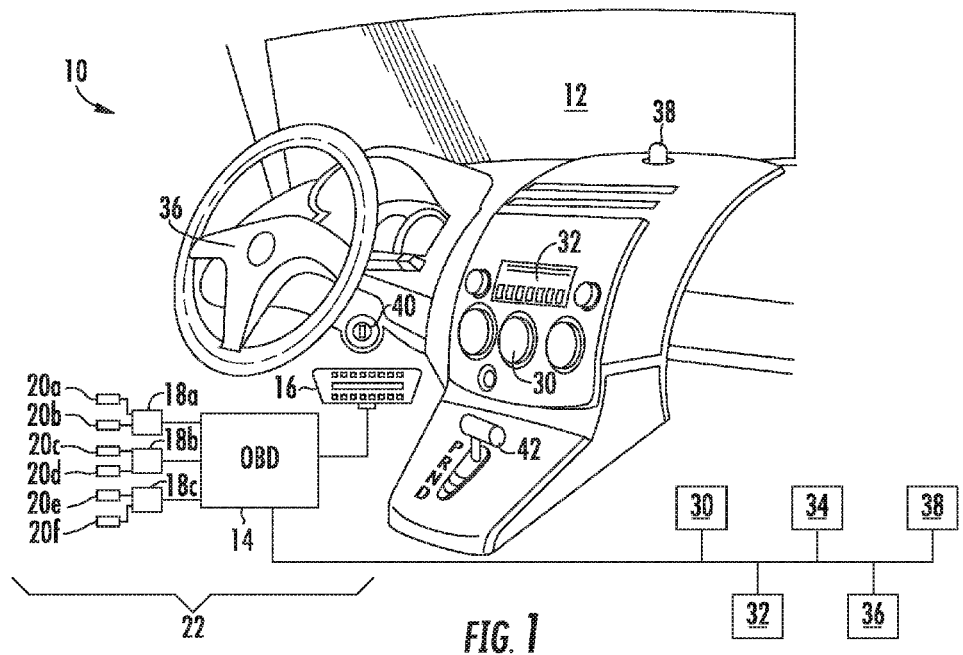
FIG. 1 is a partial diagrammatic view of a forward interior section of a vehicle.

FIG. 1 shows a partial diagrammatic view of a vehicle 10. Vehicle 10 is an automobile 10, although other vehicles are envisioned. The view is of the interior 12 of vehicle 10. Vehicle 10 has an On-Board Diagnostic (OBD) system 14. The OBD system 14 has an OBD port 16 which provides for diagnostic equipment to access the OBD system 14. The OBD port 16 shown here resembles that of an OBD-II port although other communication ports may be used. The OBD system is connected to various systems and subsystems 18*a*, 18*b*, 18*c* and their respective sensors 20*a*, 20*b*, 20*c*, 20*d*, 20*e*, 20*f* by a vehicle communication system 22. Sensors 20*a*, 20*b*, 20*c*, 20*d*, 20*e*, 20*f* may also be referred to as vehicle sensors 20*a*, 20*b*, 20*c*, 20*d*, 20*e*, 20*f* The vehicle communication system 22 may be a controller area network (CAN bus).

Sensor 20*a* may be a first sensor 20*a*. First sensor 20*a* is in communication with the OBD system 14. First sensor 20*a* provides first sensor data to the OBD system 14. First sensor 20*a* may be an interior cabin temperature sensor 20*a*, or equivalent thereof. The first sensor data may be that of a temperature level within the interior 12 of the vehicle 10 while the vehicle is parked. The interior cabin sensor 20*a* may be part of a system 18*a*. System 18*a* may be a climate control system 30 within the vehicle.

Alternately, sensor 20*b* may be a first sensor 20*b*. First sensor 20*b* is in communication with the OBD system 14. First sensor 20*b* provides first sensor data to the OBD system 14. First sensor 20*b* may be an exterior cabin (ambient) temperature sensor 20*b* (or a system with ability to access the data, such as from a local cellular network publishing such data). The exterior cabin sensor 20*b* may be used to approximate internal cabin temperature. Internal cabin temperature may be approximated using the ambient temperature after the vehicle 10 has been keyed off and parked for a period of time. The exterior cabin sensor 20*b* may be part of a system 18*a*. System 18*a* may be an infotainment system 32 within the vehicle.

Alternatively, sensor 20*c* may be a first sensor 20*c*. First sensor 20*c* is in communication with the OBD system 14. First sensor 20*c* provides first sensor data to the OBD system 14. First sensor 20*c* may be an accelerometer 20*c*, set of accelerometers 20*c*, or equivalents thereof. The first sensor data may be that of movement of the vehicle 10, specifically transverse or lateral movement of the vehicle 10 while parked. The accelerometer 20*c* may be part of a system 18*b*. System 18*b* may be a stability control system 34 (see FIG. 3) within the vehicle 10. Accelerometer 20*c* may be a roll sensor 20*c*, and the lateral accelerations noted may be that of roll fluctuations caused by movement inside the vehicle and the suspension of the vehicle 10 reacting to the movement.

Alternatively, sensor 20*d* may be a first sensor 20*d*. First sensor 20*d* is in communication with the OBD system 14. First sensor 20*d* provides first sensor data to the OBD system 14. First sensor 20*d* may be a seat weight sensor 20*d*, or equivalent thereof. The first sensor data may be that of weight on a seat, specifically fluctuations in weight that may occur from a human or animal within the vehicle moving from seat to seat while the vehicle 10 is parked. The seat weight sensor 20d may be part of a system 18b. System 18b may be an airbag system 36 within the vehicle 10.

Alternatively, sensor 20e may be a first sensor 20e. First sensor 20e is in communication with the OBD system 14. First sensor 20e provides first sensor data to the OBD system 14. First sensor 20e may be an interior cabin motion sensor 20e. The first sensor data may be that of motion within the vehicle 10, specifically movement that may occur after the vehicle has been parked and possibly after a period of time. The interior cabin motion sensor 20e may be part of a system 18c. System 18c may be a vehicle security system 38 within the vehicle 10.

Alternatively, sensor 20f may be a first sensor 20f First sensor 20f is in communication with the OBD system 14. First sensor 20f provides first sensor data to the OBD system 14. First sensor 20f may be a photo sensor 20f having a view of an interior vehicle cabin. The first sensor data may be that of motion within the vehicle 10, or identification of a human or animal within the vehicle 10. The photo sensor 20f may utilize comparative technology of a first picture of the interior 12 with no occupant to that of a second picture of the interior 12 with that of an occupant. This comparison may also be iterative to identify motion of an occupant as opposed to a stationary object within the interior. The photo sensor 20f may also be used in combination with facial character recognition software to identify a human or animal within the interior 12 of the vehicle 10. The photo sensor 20f may be part of a system 18c.

A second vehicle sensor 30, third vehicle sensor 32, fourth vehicle sensor 34, fifth vehicle sensor 36, or sixth vehicle sensor 38 may also be located on the vehicle 10 and in communication with the OBD system 14. The sensors 30, 32, 34, 36, 38 may be any combination of the above examples of a first sensor 20a, 20b, 20c, 20d, 20e, 20f.

Additional data may be available on the vehicle communication system 22 such as ignition status, such as the position of an ignition switch 40. Or transmission status, such as the position of a gear selector lever 42, or its equivalent. The vehicle communication system 22 may also contain data on whether an engine (or electric motor) is running (on), whether the vehicle heating or cooling system is on or available to be turned on, if the vehicle is moving, stopped, or parked, for how long the vehicle has been moving, stopped, or parked, and possibly, if global positioning system is available, the location of the vehicle 10.

Figure 2:
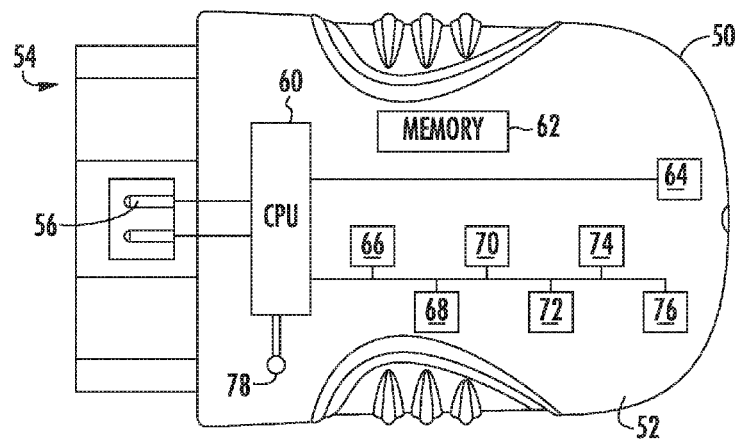
FIG. 2 is a diagrammatic illustration of a dongle showcasing an embodiment.

FIG. 2 shows an example of dongle 50. Dongle 50 is configured to couple with an On-Board Diagnostic (OBD) system 14 (see FIG. 1) of vehicle 10. Dongle 50 has a housing 52. Dongle 50 has an edge 54 and a connector 56 disposed along the edge 54 of the housing 52. Connector 56 is configured to couple with the OBD port 16 (see FIG. 1).

Dongle 50 has a Central Processing Unit (CPU) 60 disposed within the housing 52. The CPU 60 is electrically connected to the connector 56. The CPU 60 is programmed to couple with and access data from the OBD system 14 (see FIG. 1). The dongle 50 may also have a memory 62 disposed within the housing 52. The CPU 60 is electrically connected to the memory 62. Memory 62 may store first sensor data.

A second sensor 64 is at least partially disposed within the housing 52. The second sensor 64 may also be referred to as a dongle sensor 64 or a first dongle sensor 64. The second sensor 64 is in communication with the CPU 60. The second sensor 64 provides second sensor data to the CPU 60.

The second sensor 64 may be a carbon dioxide sensor 64. The second sensor data provided by the carbon dioxide sensor may be carbon dioxide levels within an interior 12 of the vehicle 10 (see FIG. 1). Alternatively, the second sensor 64 may be a noise sensor 64. The second sensor data provided by the noise sensor 64 may be sound frequency and sound pressure level (or intensity).

A second dongle sensor 66, third dongle sensor 68, fourth dongle sensor 70, fifth dongle sensor 72, sixth dongle sensor 74, or seventh dongle sensor 76 may also be located within or on the dongle 50 and in communication with the CPU 60. The additional dongle sensors 66, 68, 70, 72, 74, 76 may be any combination of the above two examples of a second sensor 64 or any first sensor 20a, 20b, 20c, 20d, 20e, 20f.

The dongle 50 may also be equipped with a transmitter 78. The transmitter 78 is at least partially disposed within the housing 52 and is electrically connected to the CPU 60. Transmitter 78 may be a transceiver 78, and thus also be capable of receiving signals as well as sending them. Transmitter 78 may be configured to send radio frequency signals, infrared frequency signals, cellular phone signals, signals intercept able by satellite communication systems, signals compatible with Bluetooth® devices, signals compatible with Wi-Fi® devices, or other known form of wireless communication signals. The transmitter 78 may be used to send a response signal (upon instruction from the CPU 60) as a notification to another location. The CPU 60 may instruct the transmitter 78 to send a response signal based on receiving first and second signal data each being above a threshold value.

The memory 62 may store first sensor data threshold values and second sensor data threshold values. The first sensor data threshold for use with an interior cabin temperature sensor 20a (see FIG. 1) could be set at 90 degrees Fahrenheit and above. The first sensor data threshold for use with an interior cabin temperature sensor 20a (see FIG. 1) may also be set at 40 degrees Fahrenheit and below. The first sensor data threshold value for use with an exterior cabin temperature sensor 20b (see FIG. 1) may be set at 80 degrees Fahrenheit and above along with an indication of the vehicle cooling system being off (vehicle key-off) for 30 minutes or longer. The first sensor data threshold value for use with an exterior cabin temperature sensor 20b (see FIG. 1) may be set at 32 degrees Fahrenheit and below along with an indication of the vehicle heating system being off (vehicle key-off) for 30 minutes or longer.

The first sensor data threshold value for use with an accelerometer 20c (see FIG. 1) could be set at any notable transverse/lateral movement of the parked vehicle (roll of the vehicle). The first sensor data threshold value for a seat weight sensor 20d (see FIG. 1) could be set at any fluctuations in weight on a seat inside the parked vehicle, or changes in weight from one seat to another indicating a human or animal moving from seat to seat within the interior.

The first sensor data threshold used with an interior cabin motion sensor 20e (see FIG. 1) could be any motion within the cabin of the vehicle. The first sensor data threshold used in conjunction with a photo sensor 20f (see FIG. 1) could be any identification of a human or animal within the parked vehicle.

The second sensor data threshold used I conjunction with a carbon dioxide sensor 64 could be set at 2500 parts per million of carbon dioxide. The second sensor data threshold used with a noise sensor 64 could be set at is a fluctuating frequency above 85 hertz and sound pressure level of 80 decibels or greater.

Figure 3:
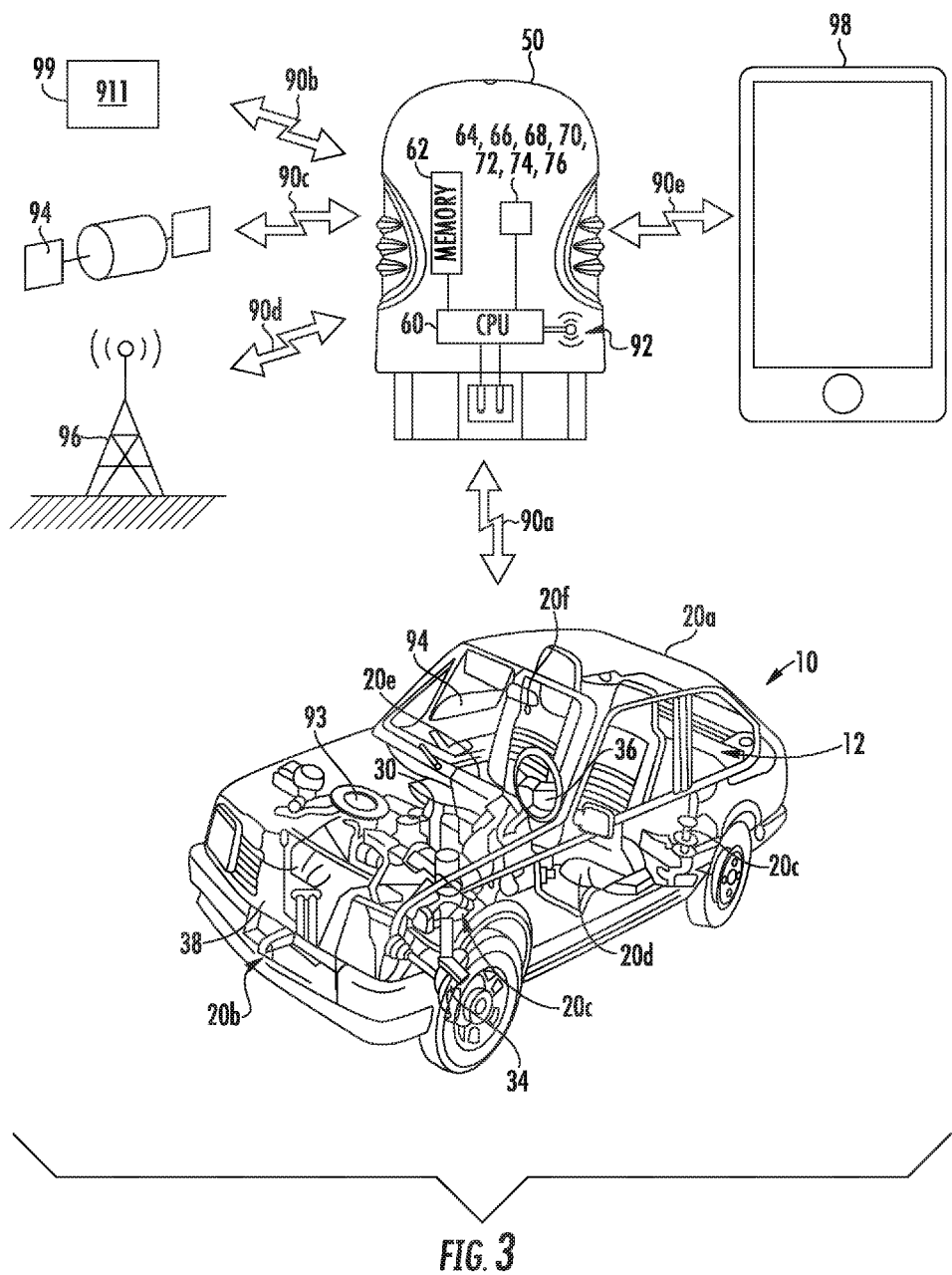
FIG. 3 is a diagrammatic illustration of a dongle communicating with other systems.

FIG. 3 shows a dongle 50 communicating with the vehicle 10 via communication line 90a communicating with other systems via communication lines 90b, 90c, 90d, 90e. The dongle 50 has a CPU 60 programmed to, upon receiving data from a second sensor 64 and from a first sensor 20*a*, 20*b*, 20*c*, 20*d*, 20*e*, 20*f*, each respectively exceeding a second sensor data threshold value and a first sensor data threshold value, as saved in the memory 62, and the vehicle being noted to be in a parked state, send a response signal 92 via one or more of the communication lines 90*a*, 90*b*, 90*c*, 90*d*, 90*e*.

In one example where the interior cabin temperature sensor 20*a* provides data exceeding the upper interior temperature threshold value, the response signal 92 is sent to the vehicle communication system 22 via communication line 90*a* to activate an air-conditioning system 30 in the parked vehicle 10. This response signal 92 may also include the automatic starting of a prime mover 93 (such as an engine or electric motor) In this example, the response signal 92 may be sent by the transmitter 92 wirelessly or sent back though the connection the dongle has at the OBD port 16 (see FIG. 1). The response signal 92 may also be sent to the vehicle communication system 22 via communication line 90*a* to automatically lower a power window 94 of the parked vehicle 10. Conversely, where the interior cabin temperature sensor 20*a* provides data lower than the lower interior temperature threshold value, the response signal 92 is sent to the vehicle communication system 22 via communication line 90*a* to activate a heating system 30 in the parked vehicle 10.

In yet another example, the response signal 92 is sent to a pre-programmed cellular number via communication lines 90*c* or 90*d*. The transmitter 92 wirelessly communicates with satellite communication systems 94 via communication line 90*c* and wirelessly communicates with cellular towers 96 via communication lines 90*d*. The response signal 92 in these two example may be in the form of a text notification being sent to a pre-programmed cellular number.

In yet even another example, the response signal 92 is sent to a mobile device 98 directly via communication line 90*e*. Communication line 90*e* may be such that the transmitter 78 sends a signal 92 that is compatible with Bluetooth® or Wi-Fi® enabled devices. Mobile device 98 may be a cellular phone 98.

In a further example the response signal 92 may be sent directly to a 911 dispatch center 99 as an emergency notification. In this example, as with any of the rest, a GPS locator may also be sent along with the response signal 92. The GPS locator may be a further sensor within the dongle 50 or from a system in the vehicle 10.

The CPU 60 of the dongle 50 may also be programmed to withhold the response signal 92 until a third sensor provides data exceeding a third sensor data threshold value. Thusly, the system may use a single vehicle sensor in combination with a single dongle sensor, or the system may utilize additional vehicle and dongle sensors to verify occupancy of a human or animal with the vehicle. In the scenario of utilizing a third (or any number of additional sensors that may be available), the CPU 60 of the dongle would verify if the sensor provides data above a predetermined threshold value (as saved in the memory 62 and provided as examples above) and thusly sends a response signal 92 to notify someone of a human or animal being left inside a parked vehicle 10.

The CPU 60 may also verify how many sensors are available in the vehicle 10, or as outfitted in the dongle 50 itself, and add additional verifications based on the programming logic saved in the memory 62 of the dongle 50. The programming logic may include information such as whether the engine is running or how long the vehicle has been in park.

Figure 4:
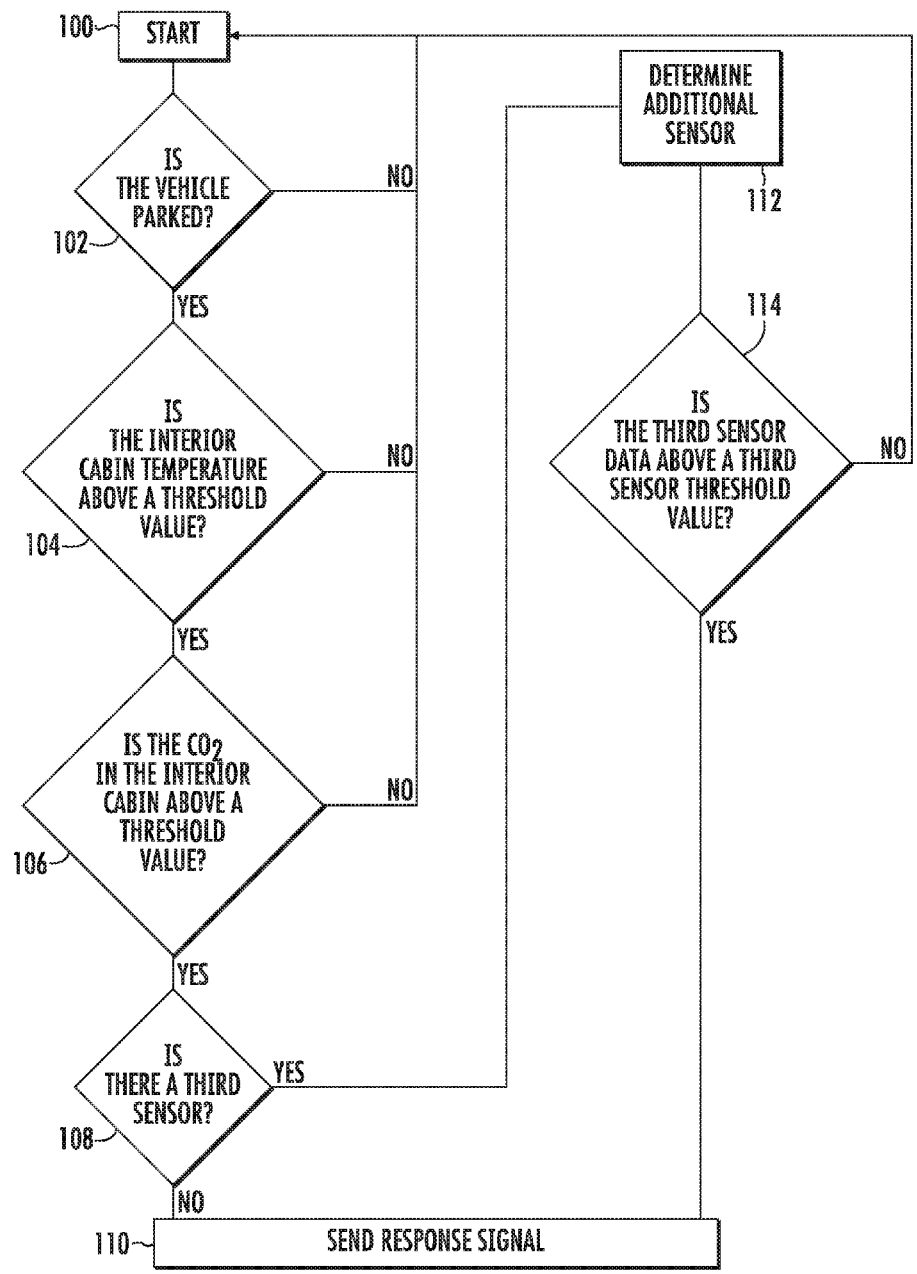
FIG. 4 is a flowchart illustrating an example of dongle program logic.

FIG. 4 shows an example of dongle program logic. At step 100, the program logic is started. At decision diamond 102, the program logic may verify if the vehicle is parked. This may occur once a vehicle is keyed off (turned off), once a vehicle is placed in park (such as a transmission or transmission selector level or switch being physically placed in park), or the vehicle simply not moving for a period of time. If the vehicle is not parked, then the logic flow returns to start 100. If the vehicle is parked, the logic flow may continue.

At step 104, the dongle may query the vehicle communication system to gather the interior cabin temperature. If the temperature is lower than a threshold temperature value, then the logic flow may return to start. If the temperature is above the threshold temperature value, then the logic flow may progress. At step 106, the dongle may provide whether the carbon dioxide level in the interior cabin is above a threshold CO2 value. If there is no noted CO2 in the cabin, then the logic flow would return to start 100. If there is CO2 above the threshold value, then the logic flow would continue. Steps 104 and 106 could occur in any order.

At step 108, the dongle may query as to whether there is yet another sensor that could be used to aid in the positive identification of a human or animal left inside the parked vehicle. If there is not a third sensor, and the previous two threshold values have been exceeded, then the dongle would send a response signal at decision block 110. The response signal may be that of a text to an owner's cellular phone.

If there are additional sensors, the dongle may proceed to decision block 112 to determine which sensor is, or how many sensors are, available. Upon determining the additional sensor, the logic flow at step 114 determines if the data from the additional sensor is above or below a threshold value for the additional sensor. If it is below, the logic flow returns to start 100. If the data is above the threshold value, then the logic flow continues on the response signal 110. The system may also be programmed to send a first response signal via one channel, such as to an owner's cell phone only based on two sensors information. After a period of time, or if additional sensors begin exceeding threshold values, the dongle may then send the response signal to a 911 dispatch.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A dongle configured to couple with an On-Board Diagnostic (OBD) system of a parked vehicle, the vehicle having a first sensor in communication with the OBD system providing first sensor data to the OBD system, the dongle comprising:
    a housing;
    a connector disposed along an edge of the housing, the connector configured to couple with an OBD port of an OBD system;
    a Central Processing Unit (CPU) disposed within the housing and electrically connected to the connector, the CPU programmed to couple with and access data from the OBD system; and
    a second sensor at least partially disposed within the housing and in communication with the CPU providing second sensor data to the CPU, wherein the CPU is programmed to, upon receiving second sensor data and first sensor data each respectively exceeding a second sensor data threshold value and a first sensor data threshold value, and the vehicle being in a parked state, send a response signal indicating the presence of a human or animal inside the parked vehicle.

2. The dongle of claim 1, wherein the second sensor is a carbon dioxide sensor and the second sensor data is carbon dioxide levels within an interior of the vehicle.

3. The dongle of claim 2, wherein the second sensor data threshold is 2500 parts per million of carbon dioxide or above.

4. The dongle of claim 1, wherein the first sensor is an interior cabin temperature sensor and the first sensor data is temperature level within an interior of the vehicle.

5. The dongle of claim 4, wherein the first sensor data threshold is 90 degrees Fahrenheit or above.

6. The dongle of claim 1, wherein the first sensor is at least one accelerometer and the first sensor data threshold value is transverse movement of the parked vehicle.

7. The dongle of claim 1, wherein the first sensor is a seat weight sensor and the first sensor data threshold value is fluctuations in weight on a seat inside the parked vehicle.

8. The dongle of claim 1, wherein the first sensor is an interior cabin motion sensor and the first sensor data threshold is motion within the cabin.

9. The dongle of claim 1, wherein the first sensor is a photo sensor having a view of an interior vehicle cabin and the first sensor data threshold is identification of a human or animal within the parked vehicle.

10. The dongle of claim 1, further comprising a third sensor at least partially disposed within the housing and in communication with the CPU providing third sensor data to the CPU, wherein the CPU is programmed to withhold the response signal until the third sensor data exceeds a third sensor data threshold value.

11. The dongle of claim 10, wherein the third sensor is a noise sensor and the third sensor data threshold is a fluctuating frequency above 85 hertz and 80 decibels.

12. The dongle of claim 1, wherein the vehicle has a third sensor in communication with the OBD system providing third sensor data to the OBD system, and the CPU is programmed to withhold the response signal until receiving third sensor data which exceeds a third sensor data threshold value.

13. The dongle of claim 1, further comprising a transmitter disposed within the housing and electrically connected to the CPU, and wherein the CPU sends the response signal to the transmitter to send a notification to a mobile electronic device.

14. The dongle of claim 13, wherein the mobile electronic device is a cellular phone and the response signal results in a text notification being sent to a pre-programmed cellular number.

15. The dongle of claim 1, further comprising a transmitter disposed within the housing and electrically connected to the CPU, and wherein the CPU sends the response signal as an emergency call to a 911 dispatch center.

16. The dongle of claim 1, wherein the response signal is sent into the OBD system to activate an air-conditioning system in the parked vehicle.

17. The dongle of claim 1, wherein the response signal is sent into the OBD system to crack open a window of the parked vehicle.

18. A lifeform recognition system for an interior of a parked automobile, the automobile having an on-board vehicle computer and at least one vehicle-based sensor providing vehicle-based sensor data to the on-board vehicle computer, the system comprising:
a dongle disposable within an interior of a parked automobile, the dongle having a central processing unit (CPU) configured to communicate with an on-board vehicle computer of the parked automobile and access the vehicle-based sensor data, the dongle having at least one dongle-based sensor configured to provide dongle-based sensor data to the CPU, and the CPU programmed to, upon receiving vehicle-based and dongle-based sensor data above a first and second sensor data threshold, respectively, send a response signal to a mobile electronic device located outside of the interior of the parked vehicle.

19. The system of claim 18, wherein the at least one vehicle-based and dongle-based sensors are selected from a group consisting of a carbon dioxide sensor, a temperature sensor, an accelerometer, a weight sensor, a motion sensor, a photo sensor, and a noise sensor, and the vehicle-based and dongle-based sensor data received by the CPU to trigger a response signal are from two different kinds of sensors.

20. The system of claim 19, where in the response signal is a text message sent to an owner of the parked automobile.

* * * * *